United States Patent
Ogawa

(10) Patent No.: US 7,972,195 B2
(45) Date of Patent: Jul. 5, 2011

(54) TIRE GRINDING METHOD AND GRINDING DEVICE

(75) Inventor: Yuichiro Ogawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 513 days.

(21) Appl. No.: 12/090,788

(22) PCT Filed: Oct. 18, 2006

(86) PCT No.: PCT/JP2006/320721
§ 371 (c)(1),
(2), (4) Date: May 29, 2008

(87) PCT Pub. No.: WO2007/046404
PCT Pub. Date: Apr. 26, 2007

(65) Prior Publication Data
US 2009/0291618 A1    Nov. 26, 2009

(30) Foreign Application Priority Data
Oct. 18, 2005  (JP) .................................. 2005-303118

(51) Int. Cl.
*B24B 49/00* (2006.01)
(52) U.S. Cl. .............................................. 451/8; 451/49
(58) Field of Classification Search .................. 451/8, 5, 451/49, 143, 146
See application file for complete search history.

(56) References Cited

U.S. PATENT DOCUMENTS

| 6,386,024 B1 | 5/2002 | Marck et al. |
| 2002/0088527 A1 | 7/2002 | Tanaka et al. |

FOREIGN PATENT DOCUMENTS

| EP | 0 514 162 A2 | 11/1992 |
| JP | 58-1546 A | 1/1893 |
| JP | 8-304009 A | 11/1996 |
| JP | 2002-86586 A | 3/2002 |
| JP | 2003-510188 A | 3/2003 |

OTHER PUBLICATIONS

Supplementary European Search Report dated Nov. 3, 2009.

*Primary Examiner* — Robert Rose
(74) *Attorney, Agent, or Firm* — Sughrue Mion, PLLC

(57) ABSTRACT

In a grinding device, first, an eddy-current-sensor detects a distance from the eddy-current-sensor to an outer peripheral surface of a belt layer while a tire to be retreaded held by a pair of half rims is caused to rotate. Thus, an eccentricity amount and an eccentricity direction of the tire to be retreaded with respect to a device axial center, corresponding to the phase of the tire to be retreaded, can be respectively determined, so position control signals corresponding to the phase, eccentricity amount and eccentricity direction of the tire to be retreaded can be generated. Next, on the basis of the position control signal, a carriage causes a rasp to be moved in a radial direction with respect to the tire to be retreaded along the radial direction whose center is a device axial center, and the rasp grinds a tread surface of the rotating tire to be retreaded.

3 Claims, 3 Drawing Sheets

TIRE GRINDING METHOD AND GRINDING DEVICE

BACKGROUND

1. Field of Invention

The present invention relates to a tire grinding method and grinding device that grind a tread portion of a tire to be retreaded in order to retread a worn tire to be retreaded.

2. Related Art

Techniques for retreading retreadable tires may be broadly classified into mold vulcanization (hot retreading), which uses a tire mold (die), and precure retreading (cold retreading), which does not use a mold but attaches a patterned tread that has already been vulcanized to a base tire and vulcanizes this in a vulcanization can. In either technique, as for the tire to be retreaded (base tire) that is supplied to retreading, first, the tread portion is cut and formed into a required shape in a buffing step, but in regard to the buffed tire after implementation of this buffing, the thickness from the embedded belt layer to the outer peripheral surface (old rubber thickness) becomes an important factor that determines the performance of the retreaded tire (particularly exothermic durability).

In Patent Document 1, there is disclosed a grinding device that can automatically control the grinding amount with respect to the base tire such that the above mentioned old rubber thickness of the base tire after grinding becomes an optimum value that has been set beforehand. In the grinding device of Patent Document 1, Japanese Patent Application Laid-Open No. 58-1546, a tire to be retreaded that is rotatably held by a holding mechanism is caused to rotate, the belt layer of the tire to be retreaded is detected by a metal sensor to measure the old rubber thickness of the tire to be retreaded, the outer peripheral surface of the tire to be retreaded is grinded by a grinding mechanism, and cutting and grinding of the tire to be retreaded by the grinding mechanism is stopped at a timing when the old rubber thickness of the tire to be retreaded becomes the optimum value.

However, in the grinding device of Patent Document 1, when the tire to be retreaded is rotated about a central axis (device axial center) of the holding mechanism and the outer peripheral surface of the tire to be retreaded is grinded by the grinding mechanism, when the device axial center and the central axis of the tire to be retreaded (tire axial center) coincide, the tire to be retreaded can be grinded such that the old rubber thickness becomes constant (the optimum value) at an arbitrary site along the tire rotational direction. However, when the device axial center and the central axis of the tire to be retreaded (tire axial center) do not coincide, the old rubber thickness along the tire rotational direction of the tire to be retreaded after grinding does not become constant, and deviation corresponding to the eccentricity amount of the tire to be retreaded arises in the old rubber thickness. For this reason, when the device axial center and the tire axial center do not coincide due to eccentricity or deformation of the tire to be retreaded, the old rubber thickness of the tire to be retreaded after grinding becomes nonuniform, performance such as durability of a retreaded tire that has been manufactured from the tire to be retreaded drops, or the old rubber thickness of the tire to be retreaded after grinding locally disappears and the belt layer becomes exposed, and there is potential to become unable to manufacture a retreaded tire from this tire to be retreaded.

In consideration of the above-described circumstances, it is an object of the present invention to provide a tire grinding method and grinding device that can grind a tire to be retreaded by grinding means such that the thickness of residual rubber on an outer peripheral side of a belt layer of the tire to be retreaded becomes constant even when eccentricity arises in the tire to be retreaded.

In order to achieve this object, a tire grinding method pertaining to a first aspect of the present invention includes: when a tire to be retreaded is loaded into a holding mechanism of a grinding device and a tread portion of the tire to be retreaded that is rotated by the holding mechanism about a device axial center is to be grinded by grinding means, detecting, with a metal detection sensor along a rotating direction whose center is the device axial center, a distance from the device axial center to a metal belt layer of the tire to be retreaded that is held by the holding mechanism, and thereafter causing the grinding means to relatively move with respect to the tire to be retreaded along a radial direction whose center is the device axial center on the basis of a position along a rotating direction of the tire to be retreaded and the detected value of the distance from the device axial center to the belt layer, and grinding, with the grinding means, the tread portion of the tire to be retreaded that is rotated by the holding mechanism.

In the tire grinding method pertaining to a first aspect, first, the distance from the device axial center to the metal belt layer of the tire to be retreaded that is rotated by the holding mechanism is detected by the metal detection sensor along the tire rotating direction, whereby the distance from the device axial center to the belt layer that corresponds to the position (phase) along the rotating direction of the tire to be retreaded can be determined as a detected value by a detection signal from the metal detection sensor, so the eccentricity amount and the eccentricity direction of the tire to be retreaded with respect to the device axial center, corresponding to the phase of the tire to be retreaded, can be respectively determined on the basis of this detected value.

In the tire grinding method pertaining to a first aspect, next, the grinding means is caused to relatively move with respect to the tire to be retreaded along the radial direction whose center is the device axial center on the basis of the phase of the tire to be retreaded and the eccentricity amount and eccentricity direction of the tire to be retreaded that have been determined as described above, and the tread portion of the tire to be retreaded that is rotated by the holding mechanism is grinded by the grinding means, whereby the tire to be retreaded can be grinded by the grinding means such that the thickness of residual rubber on the outer peripheral side of the belt layer of the tire to be retreaded becomes constant even if eccentricity with respect to the device axial center arises in the tire to be retreaded.

Further, in a tire grinding method pertaining to a second aspect in the tire grinding method of a first aspect, when the tire to be retreaded is grinded by the grinding means, the grinding means is relatively moved along the radial direction, such that a distance from a center of curvature of the belt layer of the tire to be retreaded to the grinding means becomes constant, on the basis of the position along the rotating direction of the tire to be retreaded and the detected value of the distance from the device axial center to the belt layer that has been detected by the metal detection sensor.

Further, in a tire grinding method pertaining to a third aspect in the tire grinding method of a first or second aspect, before the distance from the device axial center to the metal belt layer of the tire to be retreaded that is held by the holding mechanism is detected by the metal detection sensor along the tire rotating direction, the tread portion is grinded until groove portions substantially disappear from a tread surface of the tire to be retreaded.

A tire grinding device pertaining to a fourth aspect of the present invention includes: a holding mechanism that rotatably holds a tire to be retreaded about a device axial center and causes the tire to be retreaded to rotate about the device axial center; grinding means that contacts a tread portion of the tire to be retreaded that is rotated by the holding mechanism and grinds the tread portion; a metal detection sensor that detects, along a rotating direction whose center is the device axial center, a distance from the device axial center to a metal belt layer of the tire to be retreaded that is held by the holding mechanism; and grinding position adjusting means that causes, when the tire to be retreaded is grinded by the grinding means, the grinding means to relatively move with respect to the tire to be retreaded along a radial direction whose center is the device axial center on the basis of a position along a rotating direction of the tire to be retreaded and the detected value of the distance from the device axial center to the belt layer.

In the tire grinding device pertaining to a fourth aspect, first, the distance from the device axial center to the metal belt layer of the tire to be retreaded that is held by the holding mechanism is detected by the metal detection sensor along the tire rotating direction, whereby the distance from the device axial center to the belt layer that corresponds to the position (phase) along the rotating direction of the tire to be retreaded can be determined as a detected value by a detection signal of the metal detection sensor, so the eccentricity amount and the eccentricity direction of the tire to be retreaded with respect to the device axial center that correspond to the phase of the tire to be retreaded can be respectively determined on the basis of this detected value.

In the tire grinding device pertaining to a fourth aspect, next, the grinding means is caused to relatively move with respect to the tire to be retreaded along the radial direction whose center is the device axial center on the basis of the phase of the tire to be retreaded and the eccentricity amount and eccentricity direction of the tire to be retreaded that have been determined as described above, and the tread portion of the tire to be retreaded that is rotated by the holding mechanism is grinded by the grinding means, whereby the tire to be retreaded can be grinded by the grinding means such that the thickness of residual rubber on the outer peripheral side of the belt layer of the tire to be retreaded becomes constant even when eccentricity with respect to the device axial center arises in the tire to be retreaded.

Further, in a tire grinding device of a fifth aspect in the tire grinding device of a fourth aspect, the grinding position adjusting means causes, when the tire to be retreaded is grinded by the grinding means, the grinding means to relatively move with respect to the tire to be retreaded along the radial direction, such that a distance from a center of curvature of the belt layer to the grinding means becomes constant, on the basis of the position along the rotating direction of the tire to be retreaded and the detected value of the distance from the device axial center to the belt layer that has been detected by the metal detection sensor.

As described above, according to the tire grinding method and grinding device pertaining to the present invention, a tire to be retreaded can be grinded by grinding means such that the thickness of residual rubber on an outer peripheral side of a belt layer of the tire to be retreaded becomes constant even when eccentricity with respect to a device axial center arises in the tire to be retreaded.

DETAILED DESCRIPTION OF THE INVENTION

Below, a tire grinding device and grinding method pertaining to an embodiment of the present invention will be described with reference to the drawings.

Configuration of the Present Embodiment

Figure 1:
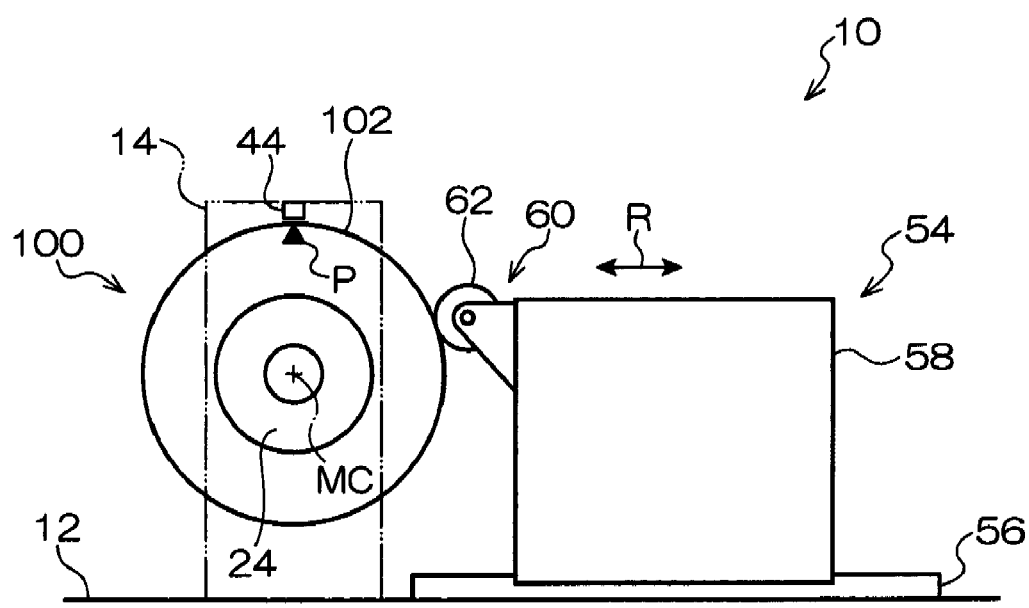
FIG. 1 A side view showing a tire grinding device pertaining to an embodiment of the present invention.
Figure 2:
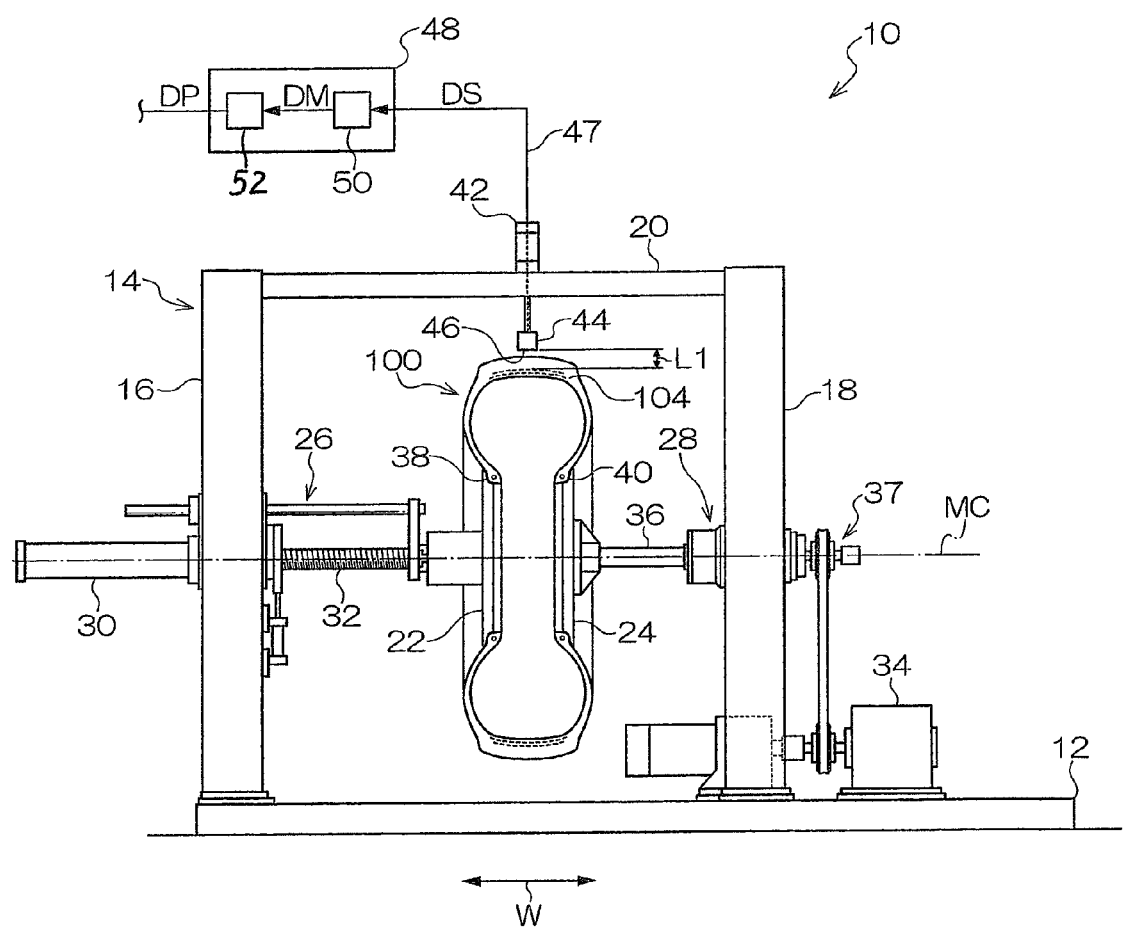
FIG. 2 A front view showing the configuration of a support frame in the grinding device shown in FIG. 1.

In FIG. 1 and FIG. 2, there is shown a tire grinding device pertaining to the embodiment of the present invention. This tire grinding device (below, simply called "grinding device") 10 is, as shown in FIG. 2, provided with a base 12 that is installed on a floor and a gatepost-like support frame 14 that is installed on this base 12. Provided on the support frame 14 are a pair of side plate portions 16 and 18 that are arranged so as to face each other along a width direction of the device (direction of arrow W) and a top plate portion 20 that bridges the upper end portions of the pair of side plate portions 16 and 18. In the support frame 14, a reciprocating mechanism 26 is disposed on the one side plate portion 16, and a rotating mechanism 28 is disposed on the other side plate portion 18.

In the grinding device 10, a pair of half rims 22 and 24 formed in disc shapes are disposed on the inner sides of the side plate portions 16 and 18, and these half rims 22 and 24 are supported by the reciprocating mechanism 26 and the rotating mechanism 28, respectively. The reciprocating mechanism 26 is provided with a linear actuator 30, and the half rim 22 is coaxially and rotatably coupled to the distal end portion of a support rod 32 that is driven in the width direction by this linear actuator 30. Further, the rotating mechanism 28 is provided with a drive shaft 36 that is disposed coaxially with the support rod 32 and to which torque from a drive motor 34 is transmitted via a torque transmitting component 37 having a belt, a pulley and the like, and the half rim 24 is coaxially and rotatably coupled to the distal end portion of this drive shaft 36.

In the grinding device 10, after the half rim 24 has been attached to one bead portion 40 of a tire to be retreaded 100, the half rim 22 whose position has been adjusted in the width direction by the linear actuator 30 is attached to another bead portion 38 of the tire to be retreaded 100. Thus, a space sealed from the outside is formed in the tire to be retreaded 100, and the tire to be retreaded 100 is expanded as a result of that sealed space being filled with compressed air that has been adjusted to a predetermined pressure.

In the grinding device 10, an eddy current sensor 44 that is a non-contact type metal detection sensor is disposed via a position adjusting mechanism 42 on the undersurface side of the top plate portion 20. The position adjusting mechanism 42 supports the eddy current sensor 44 such that the position adjusting mechanism 42 is capable of adjusting the position of the eddy current sensor 44 along an axial direction along a device axial center MC that becomes the rotational center of the half rims 22 and 24 and a radial direction that is orthogonal to this device axial center MC. In the grinding device 10, the position of the eddy current sensor 44 is adjusted by the position adjusting mechanism 42 along the radial direction and the width direction such that a predetermined clearance is provided to a width direction center of a tread surface 102 that is the outer peripheral surface of the tire to be retreaded 100. Further, the grinding device 10 is provided with a control circuit 48 for controlling operation of the entire device, the eddy current sensor 44 is connected via a wire 47 to this control circuit 48, and a detection signal DS that the eddy current sensor 44 outputs is inputted to this control circuit 48.

Here, the lower end surface of the eddy current sensor 44 is configured as a detection reference surface 46, and the eddy current sensor 44 outputs, to the control circuit 48, a detection signal corresponding to a distance L1 from this detection reference surface 46 to the outer peripheral surface of a steel belt layer 104 in the tire to be retreaded 100. The control circuit 48 is provided with a data storing component 50 and a calculating component 52.

As shown in FIG. 1, the grinding device 10 is provided with a grinding drive mechanism 54 for grinding a tread portion 103 of the tire to be retreaded 100. Disposed in the grinding drive mechanism 54 are a guide rail 56 that is fixed on the base 12 so as to extend in the radial direction and a carriage 58 that is placed on this guide rail 56 and configured to be movable in the radial direction (direction of arrow R) whose center is the device axial center MC. A grinding tool 60 for the tire to be retreaded 100 is mounted on the carriage 58, and this grinding tool 60 is provided with a rasp 62 that is a whetstone formed in a circular cylinder shape and a drive component (not shown in the drawings) having a motor and the like for causing this rasp 62 to rotate at a high speed. Further, a position adjusting mechanism for adjusting the position of the rasp 62 in the axial direction of the device (=axial direction of the tire) is disposed in the grinding tool 60 as needed.

The grinding tool 60 causes the outer peripheral surface of the rasp 62 to contact the tread surface 102 of the tire to be retreaded that rotates in one direction and causes the rasp 62 to rotate at a high speed in a following direction or a reverse direction with respect to the tire to be retreaded 100, whereby the grinding tool 60 grinds (cuts and polishes) the tread surface 102 of the tire to be retreaded 100.

Operation of the Present Embodiment

The operation of the grinding device 10 pertaining to the present embodiment that is configured as described above and a method of grinding the tire to be retreaded 100 that is implemented by this grinding device 10 will be described.

In the grinding device 10, when a measurement start command is inputted from an operation component (not shown in the drawings), the tire to be retreaded 100 is caused to rotate in one direction by the rotating mechanism 28, and the detection signal DS outputted from the eddy current sensor 44 starts to be stored in the data storing component 50 at a timing when a predetermined reference phase point P (see FIG. 1) in the rotational direction of the tire to be retreaded 100 reaches a detection position of the eddy current sensor 44, and storage of the detection signal DS from the eddy current sensor 44 by the data storing component 50 is completed at a timing when the reference phase point P of the tire to be retreaded 100 again reaches the detection position of the eddy current sensor 44. Thus, the detection signals DS corresponding to one rotation of the tire to be retreaded 100 are stored in the data storing component 50 as measurement data DM with respect to the belt layer 104.

When the measurement data DM is stored in the data storing component 50, the control circuit 48 outputs this measurement data DM to the calculating component 52. On the basis of the measurement data DM, the calculating component 52 generates, for every predetermined control pitch, position control signals DP corresponding to one rotation of the tire to be retreaded 100, that is, a range from the reference phase point P (0°) to 360°.

Next, when a grinding start command is inputted from the operation component, the control circuit 48 causes the carriage 58 that had been in a standby position away from the tire to be retreaded 100 to move towards the tire to be retreaded 100 along the guide rail 56, causes the rasp 62 of the grinding drive mechanism 54 to rotate at a high speed, and causes this rasp 62 to contact the tread surface 102 of the tire to be retreaded 100.

Figure 3A:
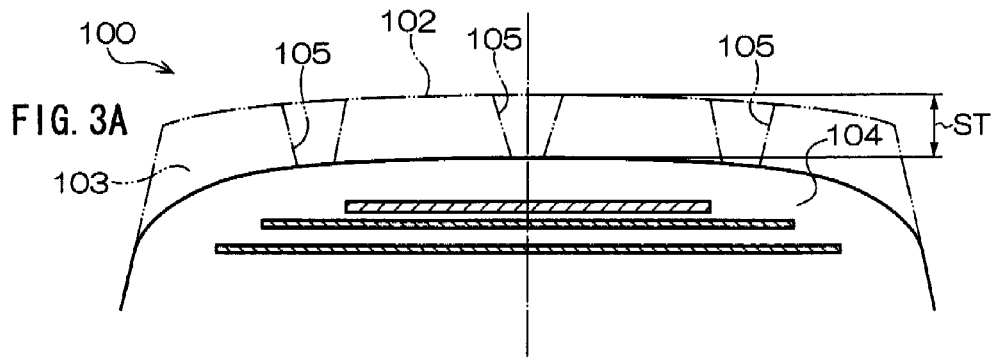
FIG. 3A A cross-sectional view, along a radial direction, of a tire to be retreaded that is grinded by the grinding device shown in FIG. 1.

At this time, the control circuit 48 causes the carriage 58 to move forward and backward along the guide rail 56 on the basis of the position control signal DP, to thereby causes the rasp 62 to move along the radial direction to a position corresponding to the position control signal DP. Specifically, the control circuit 48 causes, on the basis of the position control signal DP, the carriage 58 to move along the radial direction with respect to the tire to be retreaded 100 such that a distance R from a tire axial center TC (see FIG. 3A and FIG. 3B) that is a radius of curvature center point of the belt layer 104 to the rasp 62 becomes constant. However, because the distance R itself becomes smaller by a distance that is equal to a later-described grinding amount ST from the point in time when grinding starts to the point in time when grinding ends, the control circuit 48 uses, as a control period, a period when the tire to be retreaded 100 completes one rotation from the reference phase point P, and the control circuit 48 maintains the distance R at a constant during this control period.

Further, when the rasp 62 contacts the tread surface 102, the control circuit 48 sets this position as a grinding start position of the rasp 62 and sets a grinding end position of the rasp 62 in accordance with the necessary grinding amount ST (see FIG. 3A) with respect to the tire to be retreaded 100. Here, the grinding end position of the rasp 62 becomes a position on the inner peripheral side a distance that is equal to the grinding amount ST with respect to the grinding start position along the radial direction whose center is the tire axial center TC. The control circuit 48 causes the rasp 62 to move at a predetermined grinding speed from the grinding start position to the grinding end position. Thus, the tread portion 103 of the tire to be retreaded 100 is grinded by the rasp 62, and the tread portion 103 remaining on the outer peripheral side of the belt layer 104 is removed from the outer peripheral side.

In the grinding device 10 described above, first, the tire to be retreaded that is held by the pair of half rims 22 and 24 is caused to rotate, and the distance L1 from the detection reference surface 46 to the outer peripheral surface of the belt layer 104 is detected by the eddy current sensor 44, whereby, on the basis of this distance L1 and a device constant (distance from the detection reference surface 46 to the device axial center MC), the measurement data DM corresponding to the distance from the device axial center MC to the outer peripheral surface of the belt layer 104 that corresponds to a phase whose reference is the reference phase point P of the tire to be retreaded 100 can be obtained, so the eccentricity amount and the eccentricity direction of the tire to be retreaded 100 with respect to the device axial center that correspond to the phase of the tire to be retreaded can be respectively determined on the basis of this measurement data DM, and the control signal DP corresponding to the phase, eccentricity amount and eccentricity direction of the tire to be retreaded 100 can be generated by the calculating component 52.

Next, in the grinding device 10, on the basis of the position control signal DP that has been determined as described above, by the carriage 58, the rasp 62 is moved with respect to the tire to be retreaded 100 along the radial direction whose center is the device axial center MC, and the rasp 62 grinds the tread surface 102 of the tire to be retreaded 100 that is rotated by the rotating mechanism 28. At this time, the control circuit 48 causes the carriage 58 to move along the radial direction, such that the distance R from the tire axial center TC to the rasp 62 becomes constant, on the basis of the position control signal DP corresponding to the eccentricity amount and the eccentricity direction with respect to the device axial center MC corresponding to the phase of the tire to be retreaded 100.

Figure 3B:
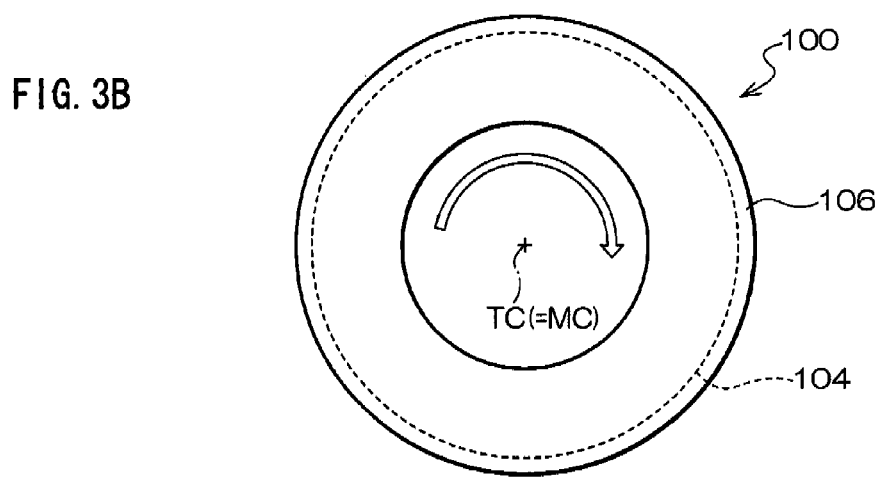
FIG. 3B A side view of the tire to be retreaded that is grinded by the grinding device shown in FIG. 1.
Figure 3C:
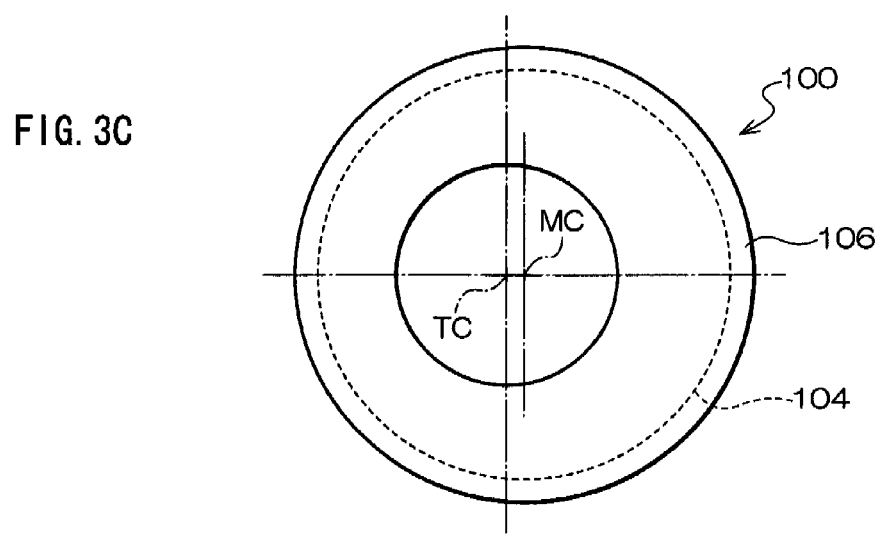
FIG. 3C A side view of the tire to be retreaded that is grinded by the grinding device shown in FIG. 1.

As a result, as shown in FIG. 3C, even if eccentricity with respect to the device axial center MC arises in the tire axial center TC of the tire to be retreaded 100, the tire to be retreaded 100 can be grinded by the rasp 62 of the grinding drive mechanism 54 such that the thickness of residual rubber 106 on the outer peripheral side of the belt layer 104 of the tire to be retreaded 100 becomes substantially constant.

Further, as shown in FIG. 3B, when eccentricity is not arisen in the tire axial center TC of the tire to be retreaded 100, the eccentricity amount at an arbitrary phase in the tire rotational direction becomes 0, so the control circuit 48 causes the rasp 62 to move at the predetermined grinding speed from the grinding start position to the grinding end position. Thus, the grinding amount at an arbitrary position along the tire rotational direction of the tire to be retreaded 100 becomes constant, and the thickness of the residual rubber 106 remaining on the outer peripheral side of the belt layer 104 also becomes substantially constant after the completion of the grinding of the tire to be retreaded 100.

It will be noted that, in the grinding device 10 pertaining to the present embodiment, the distance L1 from the detection reference surface 46 to the outer peripheral surface of the belt layer 104 is detected by the eddy current sensor 44 while the tire to be retreaded 100 is rotated in one direction by the rotating mechanism 28 in a state where groove portions 105 (see FIG. 3A) remain in the tread surface 102 of the tire to be retreaded 100. However, when the groove portions 105 remain in the tread surface 102, there is the potential for the detection precision of the eddy current sensor 44 with respect to the belt layer 104 to drop because of the affect of these groove portions 105. In order to avoid such a drop in detection precision resulting from the affect of the groove portions 105, the invention may also be configured such that, until the groove portions 105 disappear, the tread portion 103 of the tire to be retreaded 100 is roughly grinded by a grinding tool that is rougher than the rasp 62 and thereafter the tire to be retreaded 100 is grinded by the already mentioned grinding method.

Further, in the grinding device 10, the rasp 62 is caused to move in the radial direction on the basis of the position control signal DP when the tire to be retreaded 100 is to be grinded, but even when the invention is configured such that the tire to be retreaded 100 is moved along the above-described radial direction on the basis of the position control signal DP in a state where the rasp 62 is fixed, the thickness of the residual rubber 106 remaining on the outer peripheral side of the belt layer 104 can also be made substantially constant.

The invention claimed is:

1. A tire grinding method comprising:
    when a tire to be retreaded is loaded to a holding mechanism of a grinding device and a tread portion of the tire to be retreaded that is rotated by the holding mechanism about a device axial center is to be grinded by grinding means,
    detecting, with a metal detection sensor, along a rotating direction whose center is the device axial center, a distance from the device axial center to a metal belt layer of the tire to be retreaded that is held by the holding mechanism, and thereafter
    causing the grinding means to relatively move with respect to the tire to be retreaded along a radial direction whose center is the device axial center on the basis of a position along a rotating direction of the tire to be retreaded and detected value of the distance from the device axial center to the belt layer, and grinding, with the grinding means, the tread portion of the tire to be retreaded that is rotated by the holding mechanism,
    wherein when the tire to be retreaded is grinded by the grinding means, the grinding means is relatively moved along the radial direction, such that a distance from a center of curvature of the belt layer of the tire to be retreaded to the grinding means becomes constant, on the basis of the position along the rotating direction of the tire to be retreaded and the detected value of the distance from the device axial center to the belt layer that is detected by the metal detection sensor.

2. The tire grinding method of claim 1, wherein before the distance from the device axial center to the metal belt layer of the tire to be retreaded that is held by the holding mechanism is detected by the metal detection sensor along the tire rotating direction, the tread portion is grinded until groove portions substantially disappear from a tread surface of the tire to be retreaded.

3. A tire grinding device comprising:
    a holding mechanism that rotatably holds a tire to be retreaded about a device axial center and causes the tire to be retreaded to rotate about the device axial center;
    grinding means that contacts a tread portion of the tire to be retreaded that is rotated by the holding mechanism and grinds the tread portion;
    a metal detection sensor that detects, along a rotating direction whose center is the device axial center, a distance from the device axial center to a metal belt layer of the tire to be retreaded that is held by the holding mechanism; and
    grinding position adjusting means that causes, when the tire to be retreaded is grinded by the grinding means, the grinding means to relatively move with respect to the tire to be retreaded along a radial direction whose center is the device axial center, on the basis of a position along a rotating direction of the tire to be retreaded and detected value of the distance from the device axial center to the belt layer,
    wherein the grinding position adjusting means causes, when the tire to be retreaded is grinded by the grinding means, the grinding means to relatively move with respect to the tire to be retreaded along the radial direction, such that a distance from a center of curvature of the belt layer to the grinding means becomes constant, on the basis of the position along the rotating direction of the tire to be retreaded and the detected value of the distance from the device axial center to the belt layer that is detected by the metal detection sensor.

* * * * *